US006442505B1

(12) United States Patent
Lee (10) Patent No.: US 6,442,505 B1
(45) Date of Patent: Aug. 27, 2002

(54) ELECTRONIC TRIP METER FOR A BICYCLE

(75) Inventor: James Lee, Pingtung (TW)

(73) Assignee: Echowell Electronic Co., Ltd., Sanchung (TW)

( * ) Notice: Subject to any disclaimer, the term of this patent is extended or adjusted under 35 U.S.C. 154(b) by 0 days.

(21) Appl. No.: 09/386,074

(22) Filed: Aug. 30, 1999

(30) Foreign Application Priority Data

May 31, 1999 (TW) .......................................... 88208815

(51) Int. Cl.[7] ................................................. G01P 3/00
(52) U.S. Cl. ...................... 702/177; 702/160; 702/165; 702/184; 324/160; 324/166; 324/174
(58) Field of Search ................................ 702/177, 165, 702/160, 184, 149, 127; 324/160, 166, 171, 174

(56) References Cited

U.S. PATENT DOCUMENTS

| 4,334,190 A | * | 6/1982 | Sochaczevski | 702/149 |
| 4,780,864 A | * | 10/1988 | Houlihan | 324/160 |
| 5,450,325 A | * | 9/1995 | Rodriguez | 702/165 |
| 6,281,674 B1 | * | 8/2001 | Huang | 324/174 |

* cited by examiner

Primary Examiner—John S. Hilten
Assistant Examiner—Hien Vo
(74) Attorney, Agent, or Firm—Howard J. Klein (57) ABSTRACT

An electronic trip meter for a bicycle is provided. The electronic trip meter for a bicycle includes a signal generator and a main unit. The signal generator is used for generating a signal each time the bicycle travels over a specific distance, and the main unit is used for receiving the signal, evaluating and displaying the riding data, and generating an alert signal to remind the rider to execute a maintenance operation when the riding distance or the riding time exceeds a preset riding distance or a preset riding time.

19 Claims, 12 Drawing Sheets

ELECTRONIC TRIP METER FOR A BICYCLE

FIELD OF THE INVENTION

The present invention relates to an electronic trip meter, and more particularly to an electronic trip meter for a bicycle to provide an alarm system so that the rider can execute a maintenance operation when the riding distance or the riding time exceeds a preset riding distance or a preset riding time.

BACKGROUND OF THE INVENTION

Figure 1:
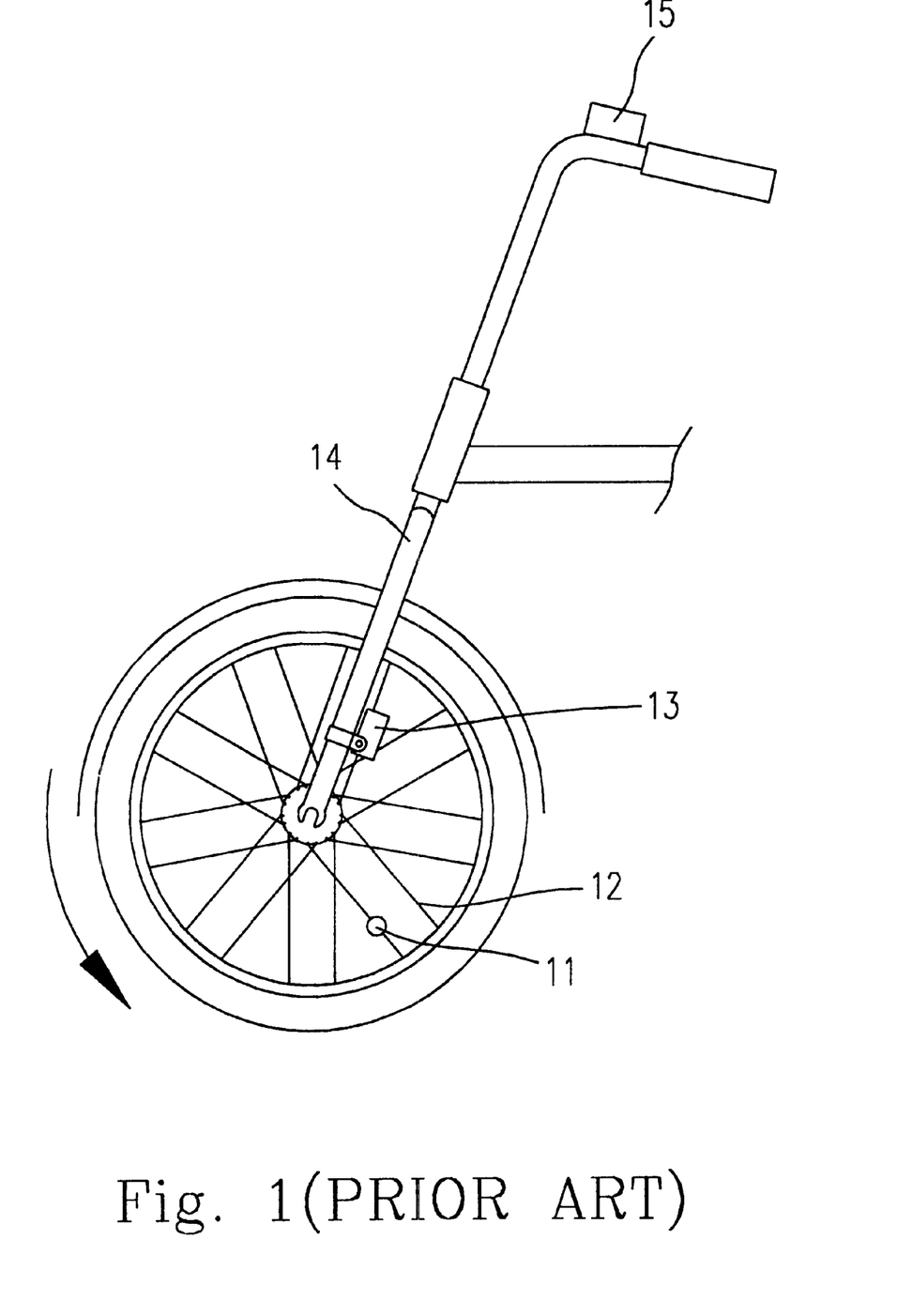
FIG. 1 illustrates the conventional electronic trip meter for a bicycle.

Currently, the bicycle has become the most popular vehicle for recreation. For a bicycle rider, an electronic trip meter for a bicycle can display the riding information such as riding speed to remind the rider to take proper procedures when riding. Therefore, an electronic trip meter for a bicycle gradually becomes a basic equipment on a bicycle. Please refer to FIG. 1 which illustrates the conventional electronic trip meter for a bicycle. A magnet 11 is mounted on the wheel spoke 12 and a signal generator 13 is mounted at an adequate position on the front wheel forks 14. The signal generator 13 includes a reed switch 131 for generating a signal when the magnet 11 passes the signal generator 13. The signal is then transmitted by a cable or wireless means to the main unit 15 of the electronic trip meter consisting of a microprocessor and a liquid crystal display (LCD). The microprocessor can evaluate the riding distance, the riding speed according to the frequency of the signal generation, times of the signal generation, and the diameter of front wheel, and display the result on the LCD for the rider.

Figure 2:
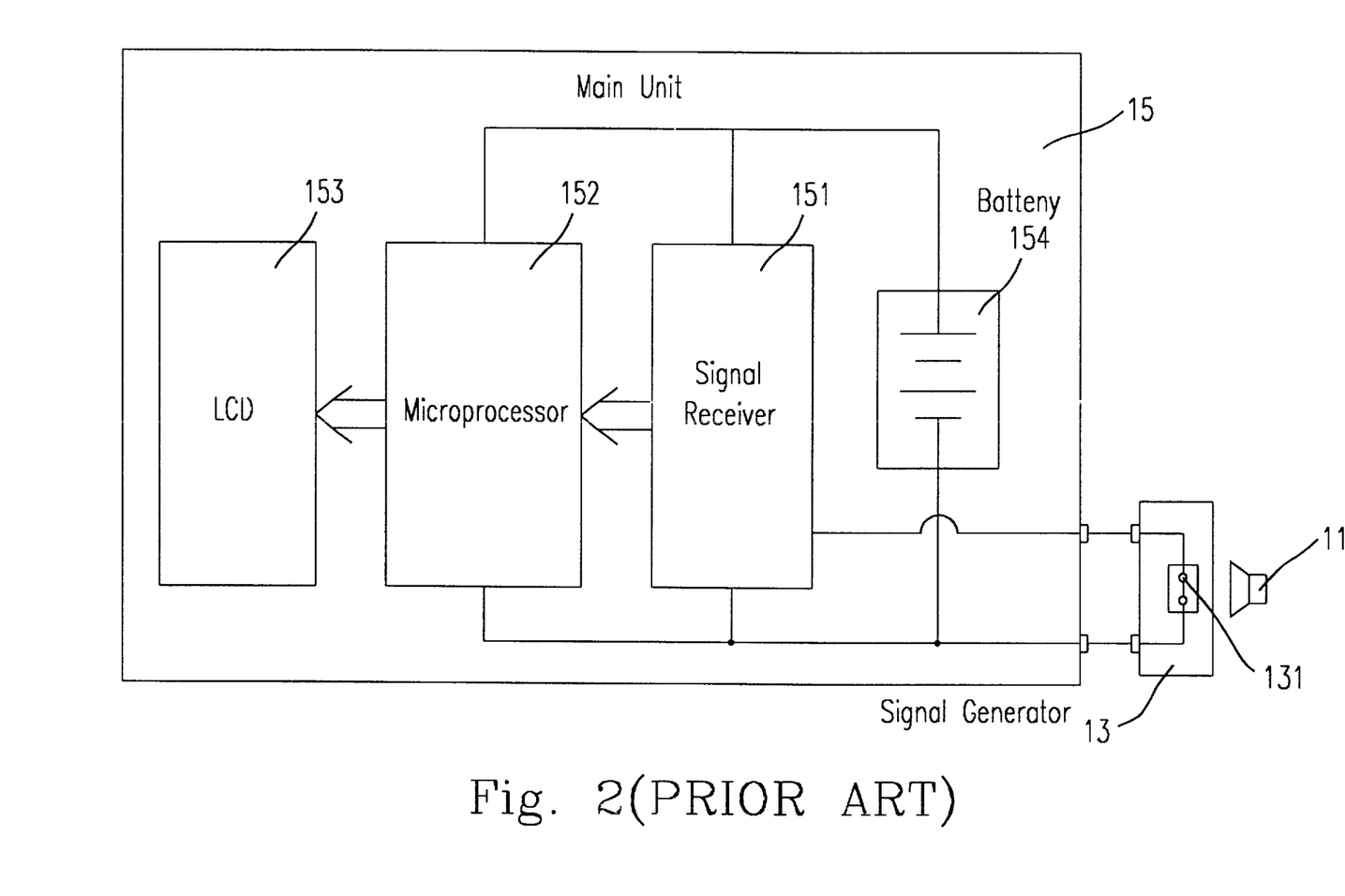
FIG. 2 is a block diagram of the main unit of the conventional electronic trip meter for a bicycle.

Please refer to FIG. 2 which is a block diagram of the main unit 15 of the conventional electronic trip meter for a bicycle. The main unit 15 consists of a signal receiver 151, a microprocessor 152, LCD 153, and a battery 154. The battery 154 is used for supplying power while the signal receiver 151 is used for receiving the signal generated from the signal generator 13. The microprocessor 152 is used for evaluating the riding distance, the riding speed according to the frequency of the signal generation, times of the signal generation and the diameter of front wheel, and for driving the LCD to display the riding data. In addition, the main unit 15 can utilize the calculating ability of the microprocessor to provide additional functions, for example, it can function as a clock.

Nowadays, how to develop an electronic trip meter for a bicycle with multiple functions in addition to all functions of the electronic trip meter for a bicycle will be an important task for the bicycle manufacturer.

SUMMARY OF THE INVENTION

An object of the present invention is to provide an electronic trip meter for a bicycle for displaying the riding data such as riding speed, riding distance, and riding time.

Another object of the present invention is to provide an electronic trip meter for a bicycle for reminding the rider to execute a maintenance operation when the riding distance or riding time exceeds a preset riding distance or a preset riding time.

According to the present invention, the electronic trip meter for a bicycle includes a signal generator and a main unit. The signal generator is used for generating a signal each time the bicycle travels over a specific distance, and the main unit is used for receiving the signal, evaluating and displaying the riding data, and generating an alert signal to remind the rider to execute a maintenance operation when the riding distance exceeds a preset riding distance.

A preferred embodiment of the main unit of the electronic trip meter includes a microprocessor and a display means. The microprocessor will receive the signal, evaluate the riding data, and generate a control signal when the riding distance exceeds a preset riding distance. The display means electrically connected to the microprocessor is used for displaying the riding data, and displaying a pattern in response to the control signal for reminding the rider to execute a maintenance operation.

An another embodiment of the main unit includes a microprocessor, a display means, and an alert signal generator. The microprocessor will receive the signal, evaluate the riding data, and generate a control signal when the riding distance exceeds a preset riding distance. The display means electrically connected to the microprocessor is used for displaying the riding data, and the alert signal generator electrically connected to the microprocessor will generate an aural alarm in response to the control signal for reminding the rider to execute a maintenance operation.

An another yet embodiment of the main unit includes a microprocessor, a display means and an alert signal generator. The microprocessor will receive the signal, evaluate the riding data, and generate a control signal when the riding distance exceeds a preset riding distance. The display means electrically connected to the microprocessor will display the riding data, and display a pattern in response to the control signal for reminding the rider to execute a maintenance operation. The alert signal generator electrically connected to the microprocessor will generate an aural alarm in response to the control signal for reminding the rider to execute a maintenance operation.

Preferably, the main unit further includes a memory unit, a mode switch key, a set key, and a clear key. The memory unit which is built in the microprocessor is used for storing the preset riding distance and the riding data. The mode switch key electrically connected to the microprocessor is used for switching a plurality of modes in accordance with the operation of the rider. The set key electrically connected to the microprocessor is used to preset a riding distance for reminding the rider to execute a maintenance operation. The clear key electrically connected to the microprocessor is used for clearing the preset riding distance and the riding data.

Preferably, the microprocessor is an LC587008 single chip micro computer, and the memory unit is a register.

Furthermore, the alert signal generator can be a buzzer, and the display means is a liquid crystal display (LCD).

In accordance with the present invention, the above-described maintenance operation is a mechanical maintenance operation or a lubricant maintenance operation.

The present invention also provides another electronic trip meter for a bicycle, including a signal generator and a main unit. The signal generator is used for generating a signal each time the bicycle travels over a specific distance, and the main unit is used for receiving the signal, evaluating and displaying the riding data, and generating an alert signal to remind the rider to execute a maintenance operation when the riding time exceeds a preset riding time.

A preferred embodiment of the main unit of the electronic trip meter includes a microprocessor and a display means. The microprocessor will receive the signal, evaluate the riding data, and generate a control signal when the riding time exceeds a preset riding time. The display means electrically connected to the microprocessor is used for displaying the riding data, and displaying a pattern in response to the control signal for reminding the rider to execute a maintenance operation.

An another embodiment of the main unit includes a microprocessor, a display means, and an alert signal generator. The microprocessor will receive the signal, evaluate the riding data, and generate a control signal when the riding time exceeds a preset riding time. The display means electrically connected to the microprocessor is used for displaying the riding data, and the alert signal generator electrically connected to the microprocessor will generate an aural alarm in response to the control signal for reminding the rider to execute a maintenance operation.

An another yet embodiment of the main unit includes a microprocessor, a display means and an alert signal generator. The microprocessor will receive the signal, evaluate the riding data, and generate a control signal when the riding time exceeds a preset riding time. The display means electrically connected to the microprocessor will display the riding data, and display a pattern in response to the control signal for reminding the rider to execute a maintenance operation. The alert signal generator electrically connected to the microprocessor will generate an aural alarm in response to the control signal for reminding the rider to execute a maintenance operation.

Preferably, the main unit further includes a memory unit, a mode switch key, a set key, and a clear key. The memory unit which is built in the microprocessor is used for storing the preset riding time and the riding data. The mode switch key electrically connected to the microprocessor is used for switching a plurality of modes in accordance with the operation of the rider. The set key electrically connected to the microprocessor is used to preset a riding time for reminding the rider to execute a maintenance operation. The clear key electrically connected to the microprocessor is used for clearing the preset riding time and the riding data.

Now the present invention will be best understood through the following description with reference to the accompanying drawings, in which:

DETAILED DESCRIPTION OF THE PREFERRED EMBODIMENT

The present invention will now be described more minutely with reference to the following embodiment. It is to be noted that the following descriptions of preferred embodiment of this invention are presented herein for the purpose of illustration and description only. It is not intended to be exhaustive or not to be restricted to the precise form disclosed.

Figure 3:
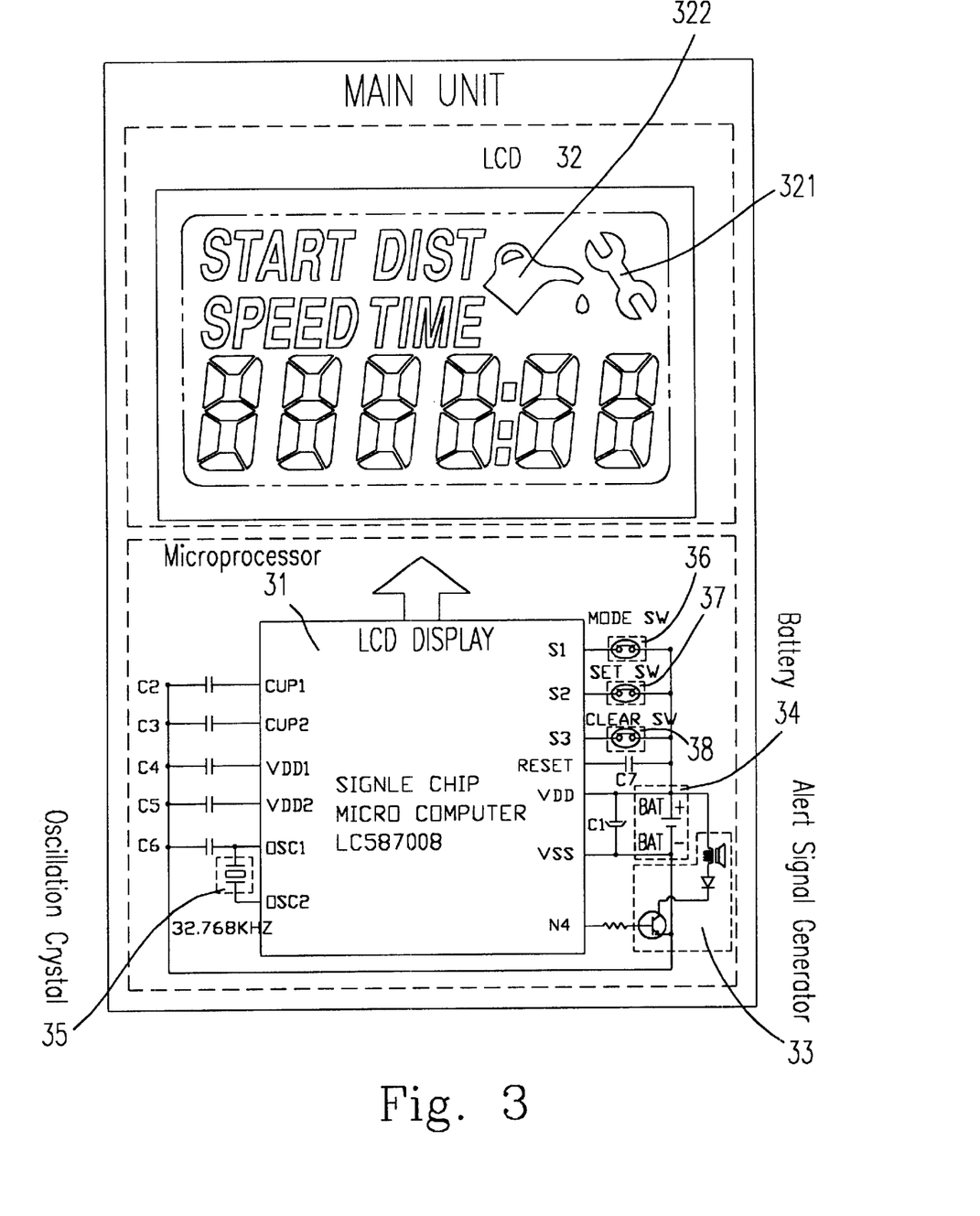
FIG. 3 is a circuit diagram of the main unit of the electronic trip meter for a bicycle according to the present invention.

Please refer to FIG. 3. The microprocessor 31 is an LC587008 single chip micro computer which will evaluate the riding speed according to the frequency of the signal generation, times of the signal generation and the diameter of front wheel and sum up the riding distance and the riding time. Furthermore, it will transmit a control signal when the riding distance exceeds a preset riding distance or the riding time exceeds a preset time. The display means 32 can be a liquid crystal display (LCD), which is used for displaying the riding speed, the riding distance, and the riding time. It is remarkable that the LCD 32 will display patterns 321 or 322 in response to the control signal to remind the rider to execute a maintenance operation. Specially, pattern 321 indicates the mechanical maintenance operation, and pattern 322 indicates the lubricant maintenance operation.

In addition, the alert signal generator 33, preferably a buzzer, will generate an aural alarm in response to the control signal to remind the rider to execute a maintenance operation.

Besides, the battery 34 is used to supply power and the oscillation frequency of the oscillation crystal is 32.768 KHZ.

The pins of the microprocessor 31 are described as follows: CUP1, CUP2, VDD1, VDD2 specify power driving pins for the LCD 32; OSC1, OSC2 specify the control pins for the oscillation crystal; N4 specify the control pin for the alert signal generator; VDD, VSS specify the positive/negative power supply pins; RESET indicates system reset pin; S1 indicates the connection port for the mode switch key; S2 indicates the connection port for the set key; and S3 indicates the connection port for the clear key.

Figure 4A:
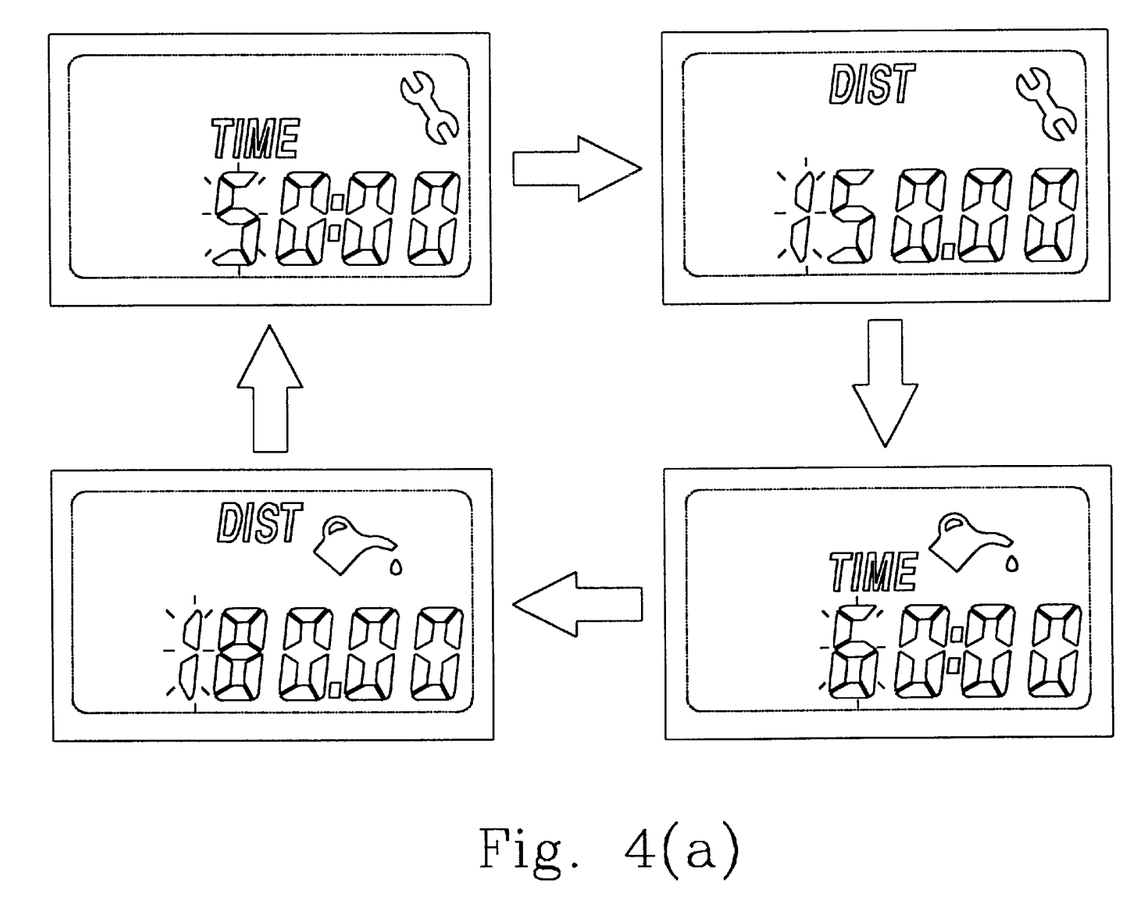
FIGS. 4(a)–(d) illustrate the setting display screen, the count down display screen, the alarm display screen and the overriding display screen, each of which has four thumbnails illustrating mechanical maintenance operation by a preset riding time, mechanical maintenance operation by a preset riding distance, lubricant maintenance operation by a preset riding time, and lubricant maintenance operation by a preset riding distance respectively.

The rider can switch four modes of LCD display by pressing the mode switch key 36. Please refer to FIG. 4(a) which illustrates the setting display screen. The rider can press the mode switch key 36 to switch to the desired display screen, preset the riding distance or riding time by pressing the set key 37 and store the settings in a memory unit built in the microprocessor. Generally, the memory unit is a register (not shown).

Figure 4B:
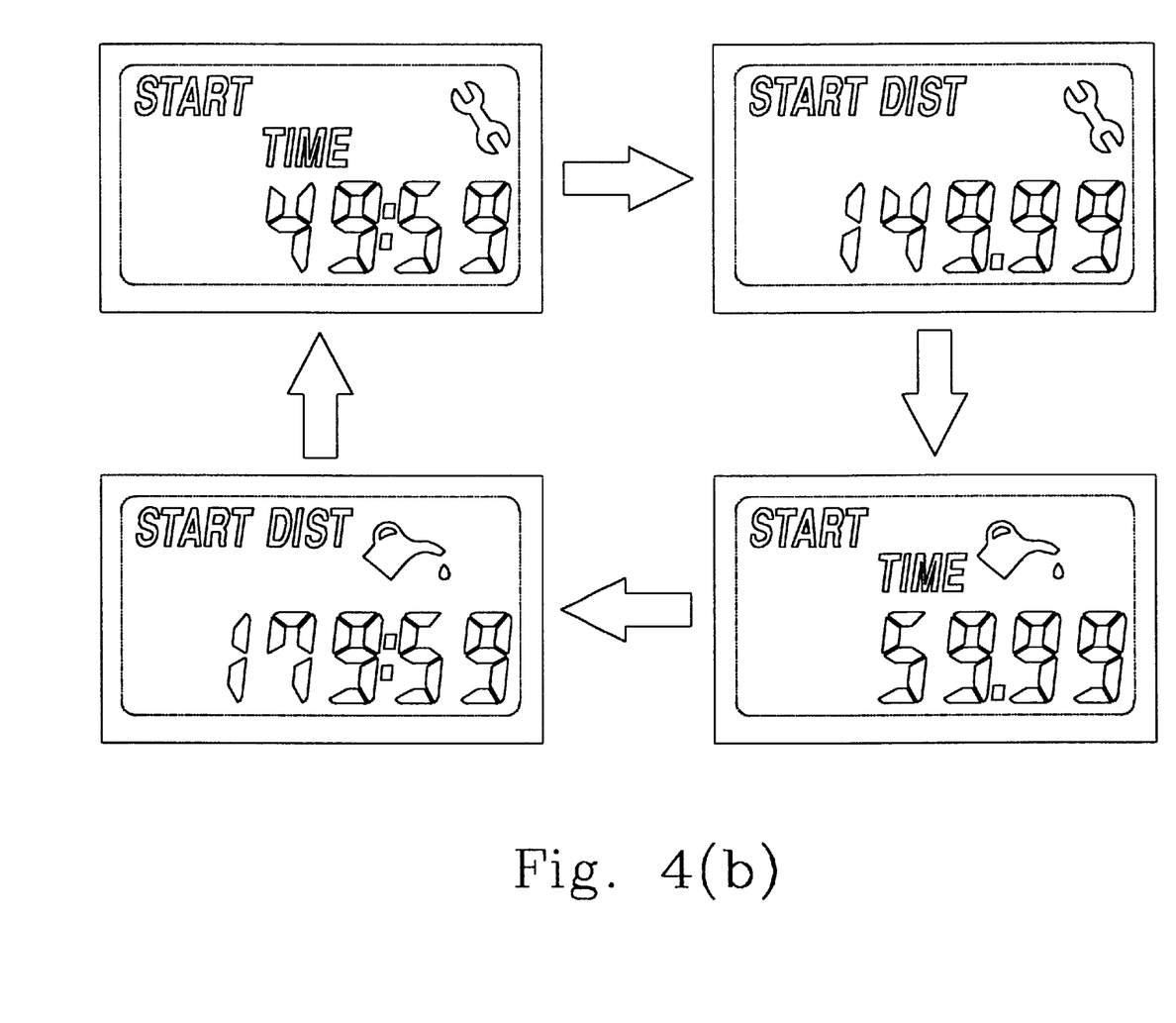

Please refer to FIG. 4(b) which illustrates the count down display screen. When the presetting procedure is finished, and the bicycle is riding, the preset riding distance or the preset riding time is counting down, which means the preset riding distance or the preset riding time is subtracted from the riding distance or the riding time. The count down display screen is displayed on the LCD 32. The riding distance and riding time is stored in the memory unit.

Figure 4C:
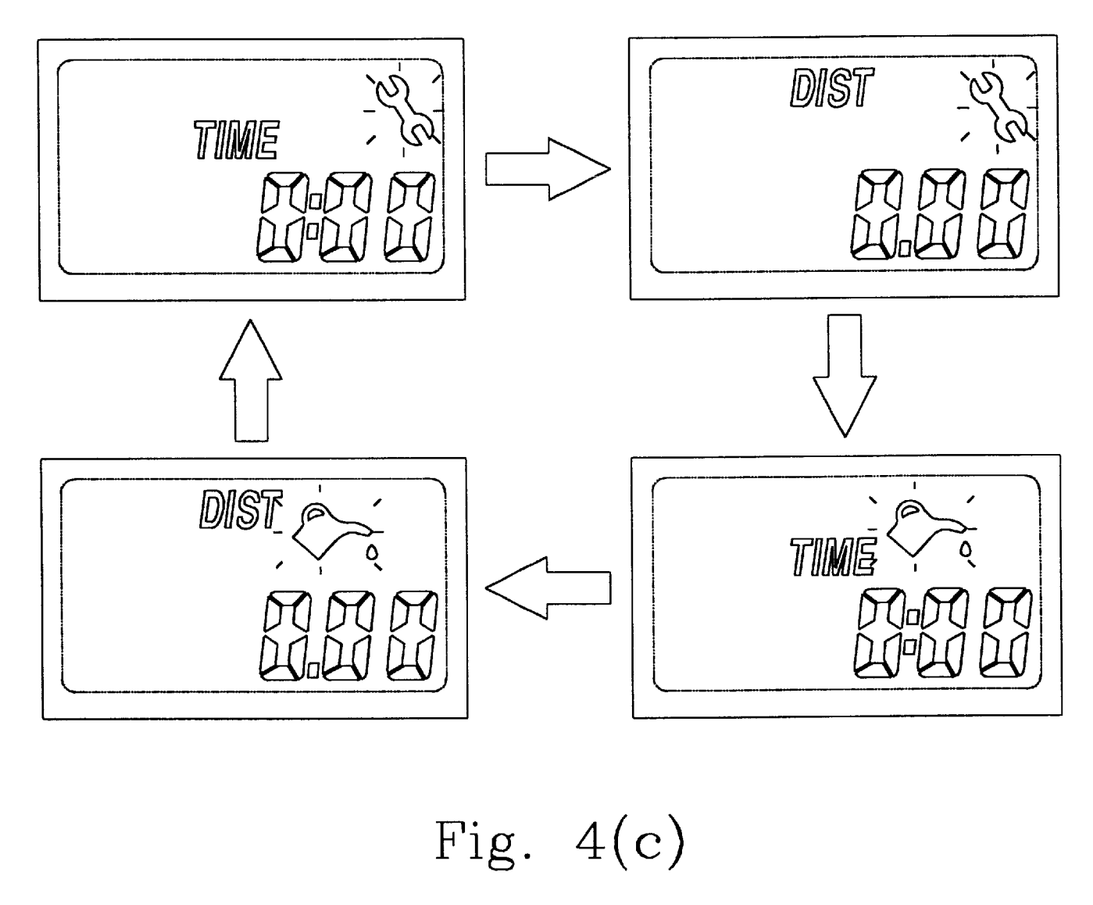

Please refer to FIG. 4(c) which illustrates the alarm display screen. The microprocessor 31 will generate a control signal for blinking the pattern 321 or 322 when the preset riding distance or the preset time is counting down to zero. At the same time, the control signal will trigger the alert signal generator 33 to generate an aural alarm to remind the rider to execute mechanical maintenance operation or lubricant maintenance operation.

Figure 4D:
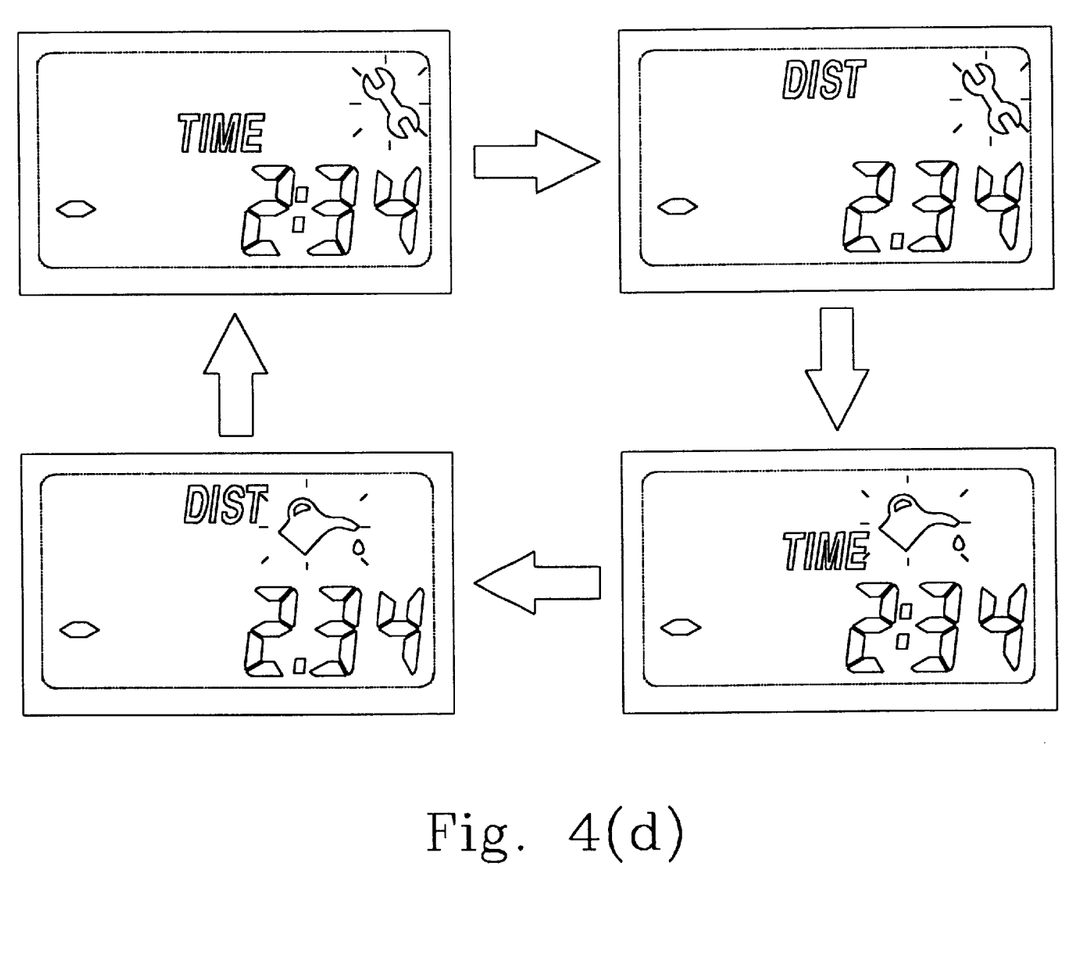

Please refer to FIG. 4(d) which illustrates the overriding display screen. When the riding distance or riding time has exceeded the preset riding distance or the preset riding time, the riding distance or riding time shown on the LCD 32 will become negative, but the count down process is still executing. The clear key 38 is used to clear the preset riding distance or the preset riding time and the riding data such as riding distance and riding time, and reload the original settings (the preset riding distance or the preset riding time) to return to the initial state.

Figure 4E:
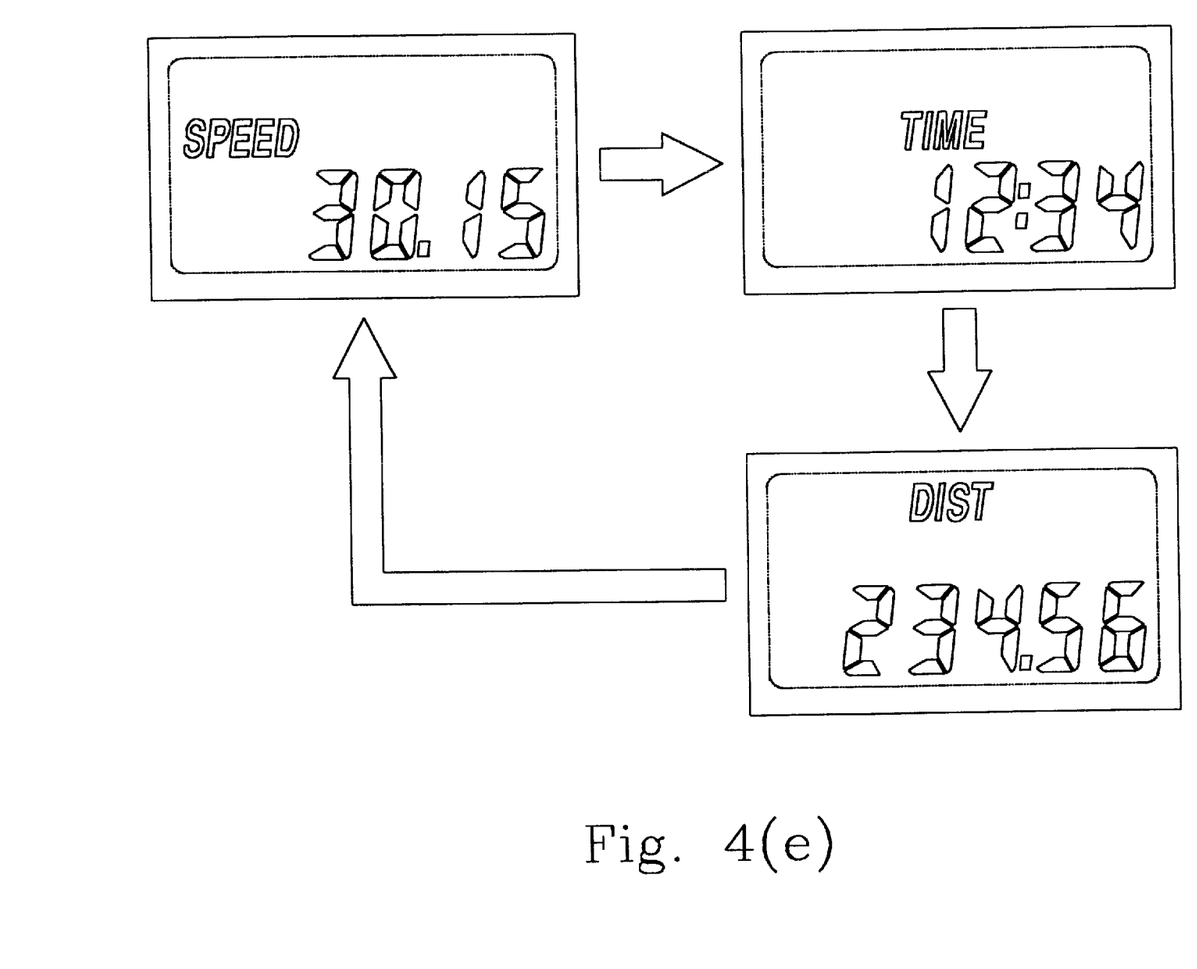
FIG. 4(e) has three thumbnails illustrating the display screen of riding speed, riding distance, and riding time respectively.

Please refer to FIG. 4(e) which illustrates the display screens of riding speed, riding distance, and riding time respectively.

In order to get a better understanding of the present invention, FIGS. 5(a)–(d) illustrate the control flow charts of mechanical maintenance operation by presetting riding time, mechanical maintenance operation by presetting riding distance, lubricant maintenance operation by presetting riding time and lubricant maintenance operation by presetting riding distance respectively.

Figure 5A:
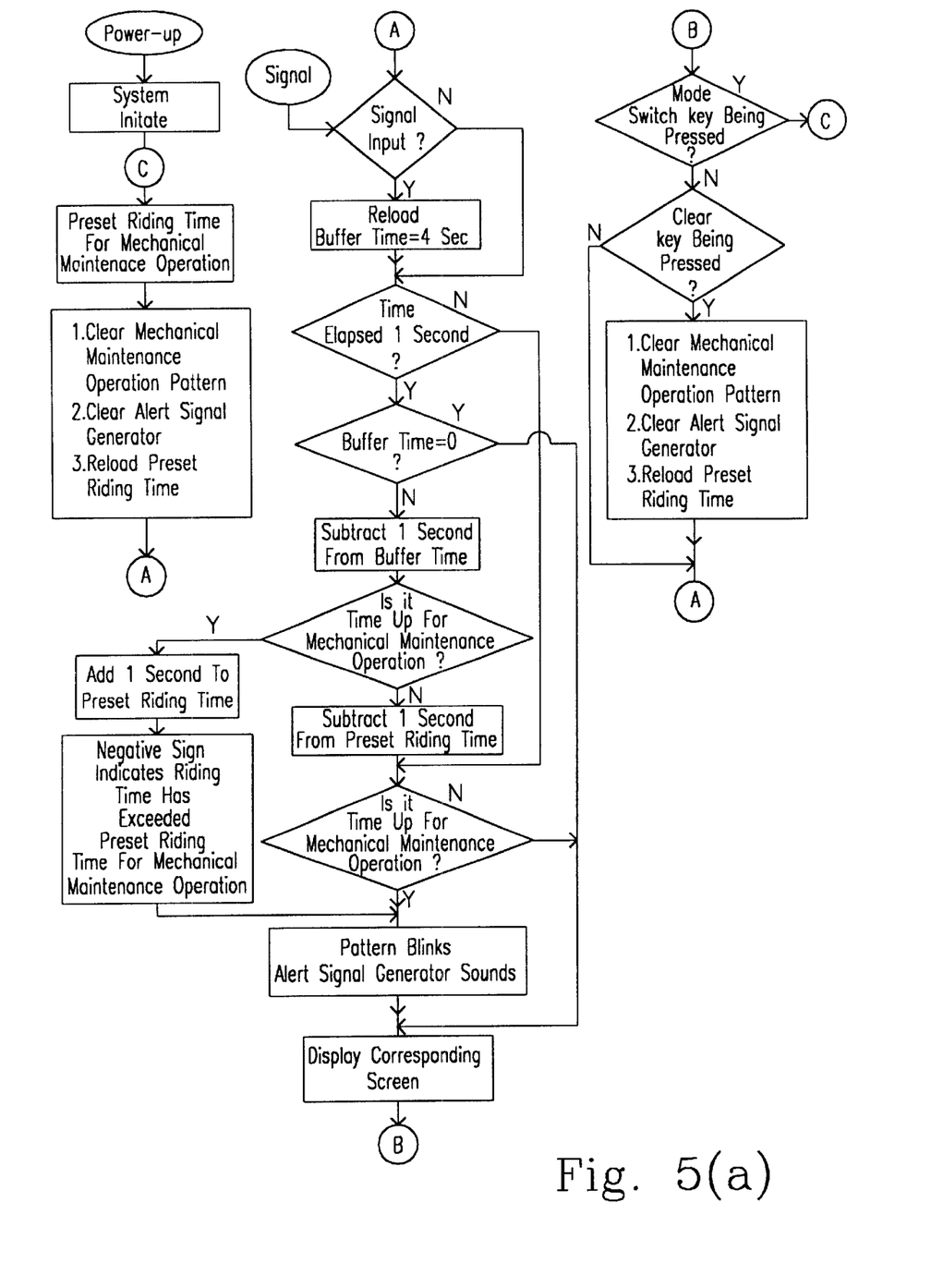
FIGS. 5(a)–(d) illustrate the control flow charts of mechanical maintenance operation by presetting riding time, mechanical maintenance operation by presetting riding distance, lubricant maintenance operation by presetting riding time and lubricant maintenance operation by presetting riding distance respectively.
Figure 5B:
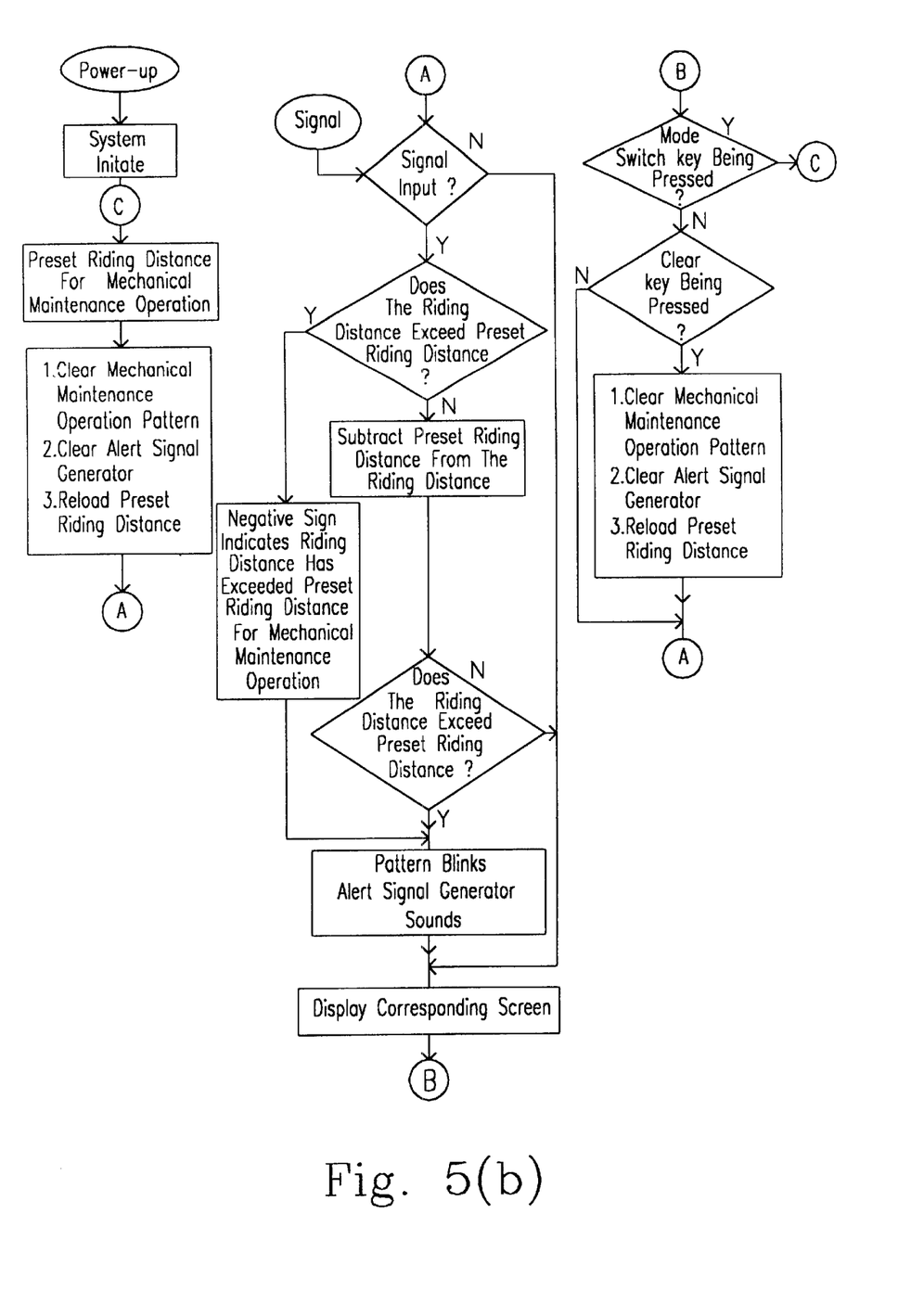
Figure 5C:
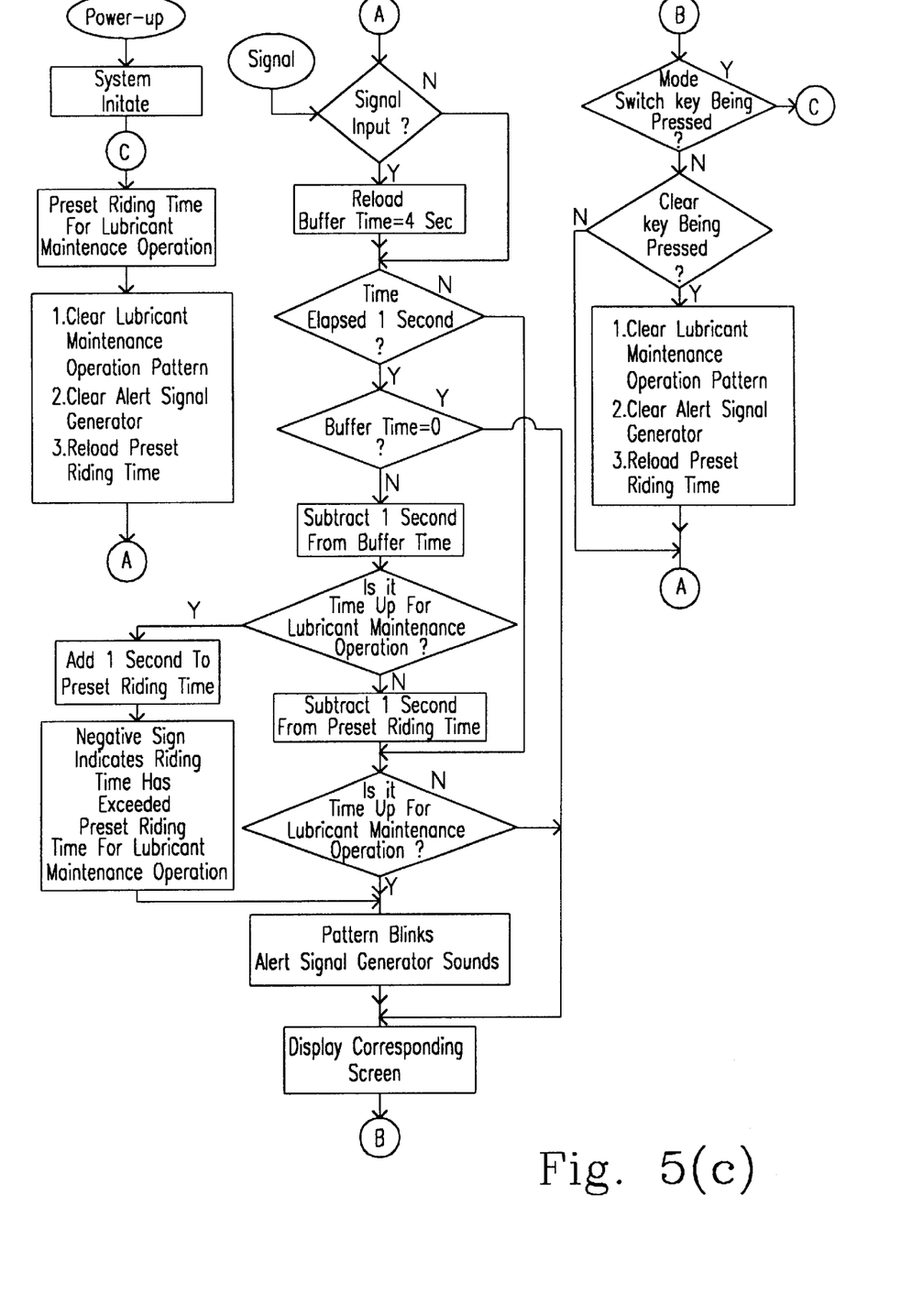

Please refer to FIG. 5(a) and FIG. 5(c). If you preset riding time for executing a maintenance operation, the riding time will sum up and the preset riding time will be subtracted from the riding time until the preset riding time was counted down to zero. When the preset riding time was counted down to zero, the corresponding pattern will blink and the alert signal generator will sound. If you ignore the alarm and keep riding, the preset riding time will become negative, while the count down process will continue and the alarm signal generator 33 will sustain sounding. The buffer time that is designated by a variable of Buffer Time (4 seconds is adopted in this preferred embodiment) is used to solve the difficulty of judgement while there is a pause in riding. The microprocessor 31 will take the time interval between the two signals into account when summing up the riding time if the time interval between two signals does not exceed the buffer time. However, the microprocessor 31 will neglect the time interval between two signals when summing up the riding time if the time interval exceeds the buffer time.

Figure 5D:
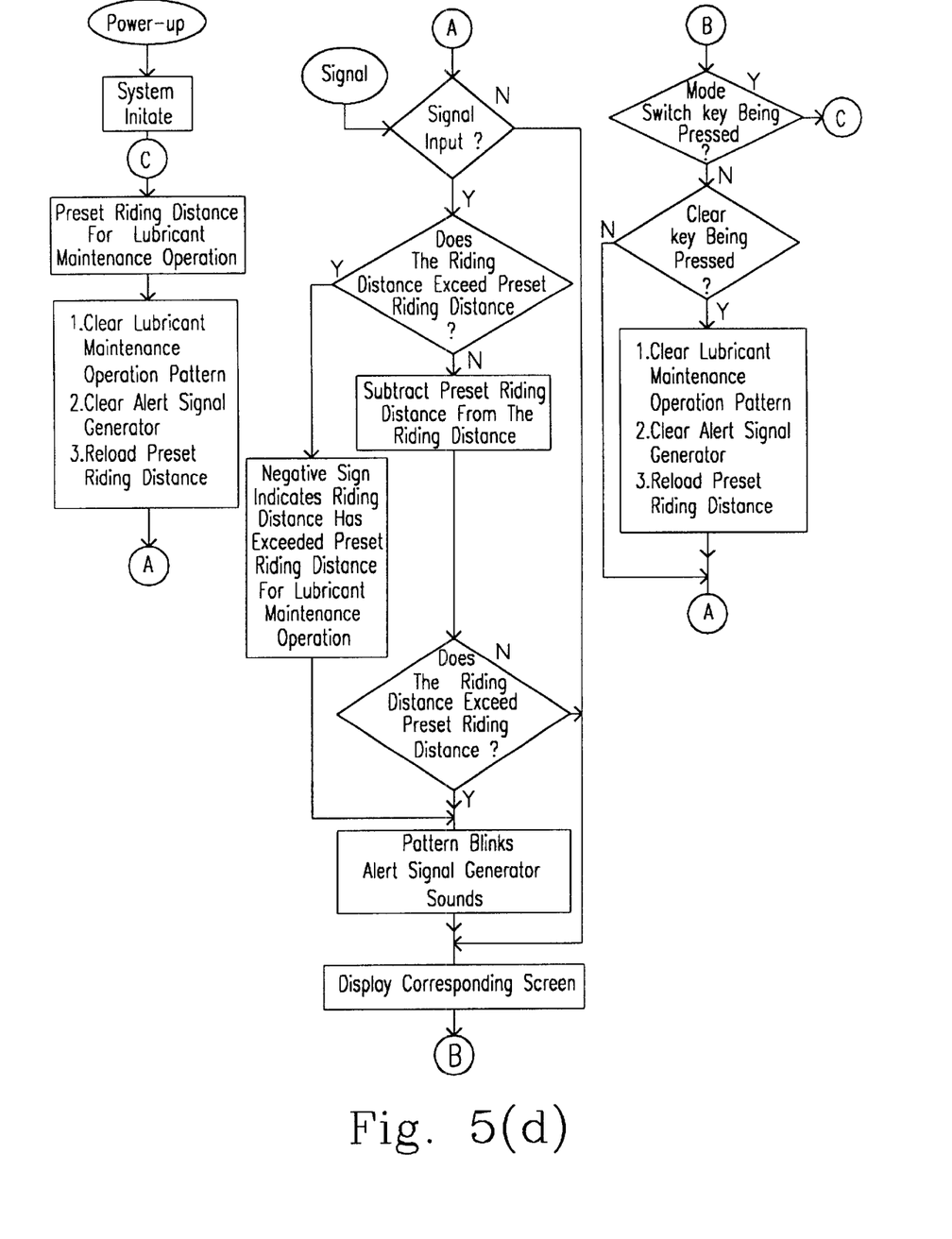

Please refer to FIG. 5(b) and FIG. 5(d). If you preset riding distance for executing a maintenance operation, the riding distance will sum up and the preset riding distance will be subtracted from the riding distance until the preset riding distance was counted down to zero. When the preset riding distance was counted down to zero, that is, the riding distance has exceed the preset riding distance, the corresponding pattern will blink and the alert signal generator 33 will sound. If you ignore the alarm and keep riding, the preset riding distance will become negative, while the count down process will continue and the alert signal generator 33 will sustain sounding.

Comparing the electronic trip meter for a bicycle of the present invention with the conventional electronic trip meter for a bicycle, the former further includes an alarm system to remind the rider to execute a maintenance operation in riding. On the other hand, a moisture sensor can be added on the electronic trip meter of the present invention in order to remind the rider to execute a maintenance operation under moist days.

While the invention has been described in terms of what are presently considered to be the most practical and preferred embodiments, it is to be understood that the invention need not be limited to the disclosed embodiment. On the contrary, it is intended to cover various be taken as limiting the scope of the present invention which is defined by the appended claims.

What we claim is:

1. An electronic trip meter for a bicycle, comprising:
   a signal generator for generating a signal each time said bicycle travels over a specific distance;
   microprocessor means for receiving said signal, evaluating riding data including riding distance, and generating a control signal when the riding distance exceeds a preset riding distance; and
   display means, electrically connected to said microprocessor, for displaying said riding data, and for displaying a pattern in response to said control signal as a reminder to execute a maintenance operation.

2. An electronic trip meter according to claim 1 wherein said electronic trip meter further comprises:
   an alert signal generator electrically connected to said microprocessor means for generating an aural alarm in response to said control signal as a reminder to execute said maintenance operation.

3. An electronic trip meter according to claim 2 wherein said microprocessor means further comprises:
   a memory unit for storing said preset riding distance and said riding data;
   a mode switch key electrically connected to said microprocessor means for allowing a selective switching among several modes;
   a set key electrically connected to said microprocessor means for presetting said preset riding distance; and
   a clear key electrically connected to said microprocessor means for clearing said preset riding distance and said riding data.

4. An electronic trip meter according to claim 3 herein said memory unit is a register.

5. An electronic trip meter according to claim 2 wherein said microprocessor is an LC587008 single chip microcomputer.

6. An electronic trip meter according to claim 2 wherein said alert signal generator is a buzzer.

7. An electronic trip meter according to claim 2 wherein said display means is a liquid crystal display (LCD).

8. An electronic trip meter according to claim 1 wherein said maintenance operation is a mechanical maintenance operation.

9. An electronic trip meter according to claim 1 wherein said maintenance operation is a lubricant maintenance operation.

10. An electronic trip meter for a bicycle, comprising:
    a signal generator for generating a signal each time said bicycle travels over a specific distance;
    microprocessor means for receiving said signal, evaluating riding data including riding time, and generating a control signal when the riding time exceeds a preset riding time; and
    display means, electrically connected to said microprocessor means, for displaying said riding data, and for displaying a pattern in response to said control signal as a reminder to execute a maintenance operation.

11. An electronic trip meter according to claim 10 wherein said electronic trip meter further comprises:
    an alert signal generator electrically connected to said microprocessor means for generating an aural alarm in response to said control signal as a reminder to execute said maintenance operation.

12. An electronic trip meter according to claim 11 wherein said microprocessor means further comprises:
    a memory unit for storing said preset riding time and said riding data;
    a mode switch key electrically connected to said microprocessor for allowing a selective switching among several modes;

a set key electrically connected to said microprocessor means for presetting said preset riding time as a reminder to execute said maintenance operation; and a clear key electrically connected to said microprocessor means for clearing said preset riding time and said riding data.

13. An electronic trip meter according to claim 12 wherein said memory unit is a register.

14. An electronic trip meter according to claim 11 wherein said microprocessor is an LC587008 single chip microcomputer.

15. An electronic trip meter according to claim 11 wherein said alert signal generator is a buzzer.

16. An electronic trip meter according to claim 11 wherein said display means is a liquid crystal display (LCD).

17. An electronic trip meter according to claim 12 wherein said microprocessor means further comprises:

a buffer unit for providing a buffer time, wherein said microprocessor means will take a time interval between two signals into account when summing up said riding time if said time interval between two signals does not exceed said buffer time, and wherein said microprocessor means will neglect said time interval between two signals when summing up said riding time if said time interval exceeds said buffer time.

18. An electronic trip meter according to claim 1, wherein a shape of said pattern is associated with mechanical and lubricant maintenance operations.

19. An electronic trip meter according to claim 10, wherein a shape of said pattern is associated with mechanical and lubricant maintenance operations.

* * * * *